(12) United States Patent
Owejan et al.

(10) Patent No.: US 8,129,075 B2
(45) Date of Patent: Mar. 6, 2012

(54) BIPOLAR PLATE HEADER FORMED FEATURES

(75) Inventors: Jon P. Owejan, Honeoye, NY (US);
Jeffrey A. Rock, Fairport, NY (US);
Steven J. Spencer, Rochester, NY (US);
Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 743 days.

(21) Appl. No.: 12/252,678

(22) Filed: Oct. 16, 2008

(65) Prior Publication Data

US 2010/0099001 A1   Apr. 22, 2010

(51) Int. Cl.
*H01M 8/04* (2006.01)

(52) U.S. Cl. ...................................................... 429/513

(58) Field of Classification Search .................. 429/450, 429/456, 458, 465, 513, 518
See application file for complete search history.

(56) References Cited

U.S. PATENT DOCUMENTS

2003/0124405 A1* 7/2003 Rock ............................... 429/34

OTHER PUBLICATIONS

Rye et al.—The Flow of Liquids in Surface Grooves Langmuir 1996, 12: 555-565.

* cited by examiner

*Primary Examiner* — Javaid Nasri
(74) *Attorney, Agent, or Firm* — Fraser Clemens Martin & Miller LLC; J. Douglas Miller

(57) ABSTRACT

A fuel cell plate including a first plate having a first header edge defining a first header aperture, the first header edge having a first break and a substantially aligned second plate having a second header edge defining a second header aperture, the second header edge having a second break. The fuel cell plate, well suited for use in a vehicle fuel cell stack, for removing water from a fuel cell stack header is disclosed.

20 Claims, 3 Drawing Sheets

BIPOLAR PLATE HEADER FORMED FEATURES

FIELD OF THE INVENTION

The invention relates to fuel cells, and more particularly to a bipolar plate for a fuel cell having features that militate against water accumulation within fuel cell stack headers.

BACKGROUND OF THE INVENTION

Fuel cell power systems convert a fuel and an oxidant to electricity. One type of fuel cell power system employs a proton exchange membrane (hereinafter "PEM") to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from the anode to the cathode in each individual fuel cell of a stack of fuel cells normally deployed in a fuel cell power system.

In the typical fuel cell stack, the individual fuel cells have fuel cell plates with channels through which various reactants and cooling fluids flow. Fuel cell plates may be unipolar, for example. A bipolar plate may be created by combining a pair of unipolar plates. Movement of water from the channels to an outlet header through a tunnel region formed by the fuel cell plates is caused by the flow of the reactants through the fuel cell assembly. Boundary layer shear forces and the reactant pressure aid in transporting the water through the channels and the tunnel region until the water exits the fuel cell through the outlet header.

Numerous techniques have been employed to remove water from the tunnel regions and headers of the fuel cell. These techniques include pressurized purging, gravity flow, and evaporation. A pressurized gas purge at shutdown may be used to effectively remove water from the tunnel regions and headers of fuel cells. However, the purge increases shutdown time of the stack and does not remove any water formed from condensation after the purge. Positioning of the stack appropriately may allow gravitational forces to remove water from the tunnel regions and headers. However, gravitational removal of water may be limited to substantially flat surfaces, surfaces having at least a minimum diameter, and surfaces of low energy. Capillary forces of the tunnel region and self wetting of the plurality of seams in the bipolar plates also militate against gravitational removal of water. Water removal by evaporation has been an undesirable technique as well. Evaporation may require costly heaters to be placed in the headers and may lead to an undesirable drying of the fuel cell stack. Additionally, evaporation may only be performed during operation of the fuel cell stack. A dry fuel cell stack militates against proton conduction and prompt starting.

Water that accumulates in the tunnel regions of the fuel cell in sub-freezing temperatures may freeze after the fuel cell is shut down. Frozen water in the tunnel regions and the headers of a fuel cell may prevent the fuel cell from restarting or result in poor performance of the fuel cell until a desired operating temperature is reached.

In addition to water produced from the fuel cell itself, water may enter the tunnel region of the fuel cell from an inlet or the outlet header. During fuel cell operation, liquid water may collect on the edges of the fuel cell plates that form the inlet and outlet headers. Also, the humid environment necessary for the operation of the fuel cell promotes water condensation in the headers after fuel cell shutdown. As the water accumulates on the edges of the fuel cell plates, the water also wicks along the edges forming the headers. The condensed water may wick into the tunnel region, causing one of a self wetting the tunnel region of the bipolar plates of the fuel cell and the formation of a plurality of menisci along an edge of the tunnel region.

There is a continuing need for a cost effective bipolar plate for a fuel cell that facilitates the removal of water from the header of the fuel cell stack, militates against water entering the tunnel regions of the bipolar plate, and militates against the tunnel regions of the fuel cell stack from becoming blocked with frozen water.

SUMMARY OF THE INVENTION

Presently provided by the invention, a cost effective bipolar plate for a fuel cell that facilitates the removal of water from the header of the fuel cell stack, militates against water entering the tunnel regions of the bipolar plate, and militates against the tunnel regions of the fuel cell stack from becoming blocked with frozen water is surprisingly discovered.

In one embodiment, the bipolar plate for a fuel cell comprises a first plate having a first header edge defining a first header aperture, the first header edge having a first break and a second plate disposed adjacent the first plate having a second header edge defining a second header aperture, the second header edge having a second break, the bipolar plate having a plurality of tunnel outlets along one of the first header edge and the second header edge, a portion of the first break abutting a portion of the second break, the first break and first header aperture substantially aligned with the second break and second header aperture.

In another embodiment, the fuel cell comprises a pair of bipolar plates for a fuel cell, each of the bipolar plates for a fuel cell having a first plate having a first header edge defining a first header aperture, the first header edge having a first break, and a second plate disposed adjacent the first plate having a second header edge defining a second header aperture, the second header edge having a second break, the bipolar plate having a plurality of tunnel outlets along one of the first header edge and the second header edge, a portion of the first break abutting a portion of the second break, the first break and first header aperture substantially aligned with the second break and second header aperture and a membrane electrode assembly disposed between the pair of bipolar plates for a fuel cell, having a third header edge defining a third header aperture, the third header edge having a third break, the third break and third header aperture substantially aligned with the first break and the second break and the first header aperture and the second header aperture.

In another embodiment, the fuel cell stack comprises a plurality of fuel cells, one of the fuel cells including a pair of bipolar plates for a fuel cell, each of the bipolar plates for a fuel cell having a first plate having a first header edge defining a first header aperture, the first header edge having a first break, and a second plate disposed adjacent the first plate having a second header edge defining a second header aperture, the second header edge having a second break, the bipolar plate having a plurality of tunnel outlets along one of the first header edge and the second header edge, a portion of the first break abutting a portion of the second break, the first break and first header aperture substantially aligned with the second break and second header aperture, and a membrane electrode assembly disposed between the pair of bipolar plates for a fuel cell, having a third header edge defining a third header aperture, the third header edge having a third break, the third break and third header aperture substantially aligned with the first break and the second break and the first header aperture and the second header aperture.

DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
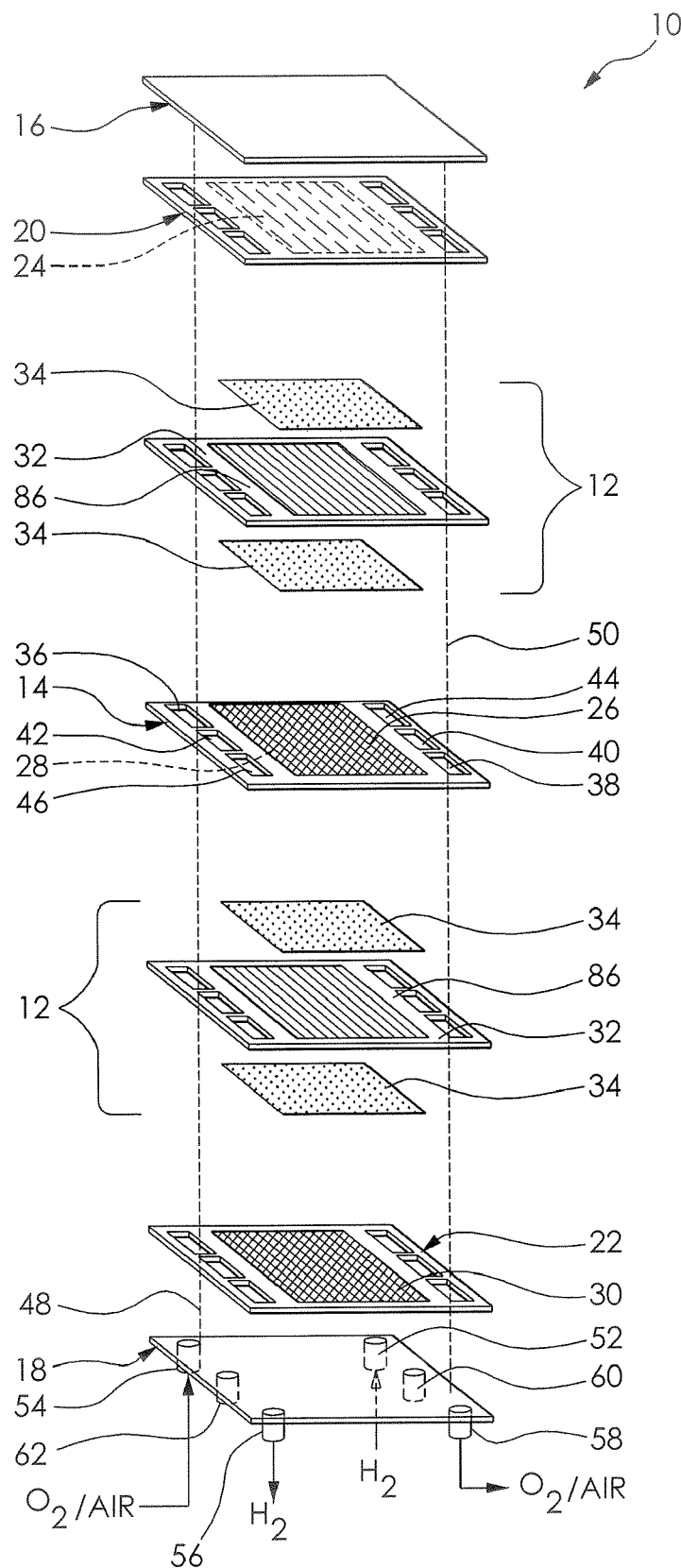
FIG. 1 is an exploded perspective view of a fuel cell stack according to an embodiment of the invention.

FIG. 1 depicts a fuel cell stack 10 having a pair of membrane electrode assemblies 12 separated from each other by an electrically conductive bipolar plate 14. For simplicity, only a two-cell stack (i.e. one bipolar plate) is illustrated and described in FIG. 1, it being understood that the typical fuel cell stack 10 will have many more cells and bipolar plates.

The membrane electrode assemblies 12 and bipolar plate 14 are stacked together between a pair of clamping plates 16, 18 and a pair of unipolar end plates 20, 22. The clamping plates 16, 18 are electrically insulated from the end plates 20, 22 by a seal or a dielectric coating (not shown). The unipolar end plate 20, both working faces of the bipolar plate 14, and the unipolar end plate 22 include respective active areas 24, 26, 28, 30. The active areas 24, 26, 28, 30 are typically flow fields for distributing gaseous reactants such as hydrogen gas and air over an anode and a cathode, respectively, of the membrane electrode assemblies 12.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer.

A plurality of nonconductive gaskets 32, which may be a component of the membrane electrode assemblies 12, militates against fuel cell leakage and provides electrical insulation between the several components of the fuel cell stack 10. Gas-permeable diffusion media 34 are disposed adjacent the membrane electrode assemblies 12. The end plates 20, 22 are also disposed adjacent the diffusion media 34, respectively, while the active areas 26, 28 of the bipolar plate 14 are disposed adjacent the diffusion media 34.

The bipolar plate 14, unipolar end plates 20, 22, and the membrane electrode assemblies 12 each include a cathode supply aperture 36 and a cathode exhaust aperture 38, a coolant supply aperture 40 and a coolant exhaust aperture 42, and an anode supply aperture 44 and an anode exhaust aperture 46. Supply headers 48 and exhaust headers 50 of the fuel cell stack 10 are formed by an alignment of the respective apertures 36, 38, 40, 42, 44, 46 in the bipolar plate 14, unipolar end plates 20, 22, and the membrane electrode assemblies 12. The hydrogen gas is supplied to an anode supply header via an anode inlet conduit 52. The air is supplied to a cathode supply header of the fuel cell stack 10 via a cathode inlet conduit 54. An anode outlet conduit 56 and a cathode outlet conduit 58 are also provided for an anode exhaust header and a cathode exhaust header, respectively. A coolant inlet conduit 60 is provided for supplying liquid coolant to a coolant supply header. A coolant outlet conduit 62 is provided for removing coolant from a coolant exhaust header. It should be understood that the configurations of the various inlets 52, 54, 60 and outlets 56, 58, 62 in FIG. 1 are for the purpose of illustration, and other configurations may be chosen as desired.

Figure 2:
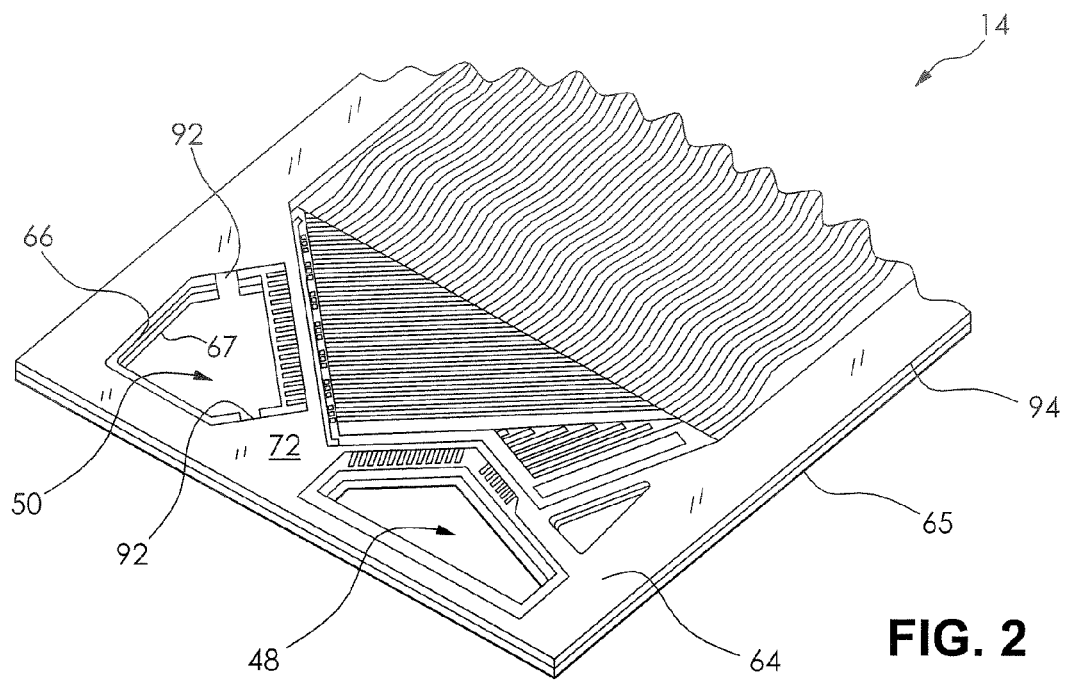
FIG. 2 is a fragmentary perspective view of a bipolar plate for a fuel cell illustrated in FIG. 1.
Figure 3:
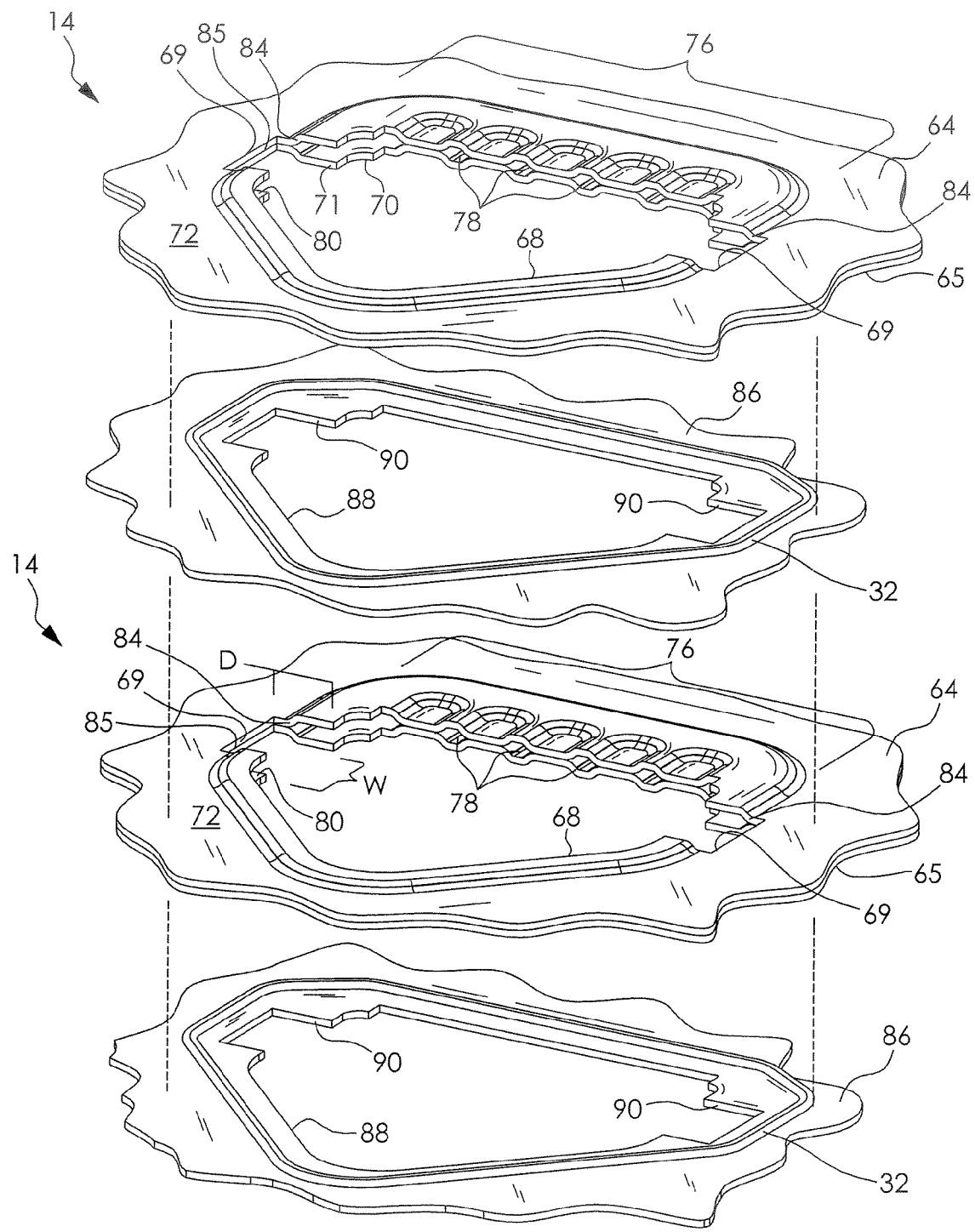
FIG. 3 is an exploded fragmentary perspective view of a portion of an exhaust header including a water removal guide according to an embodiment of the invention.

The bipolar plate 14 for the fuel cell stack 10 is illustrated in FIG. 2. The bipolar plate 14 includes a first plate 64 and a second plate 65. The first plate 64 and the second plate 65 respectively include a first header aperture 66 and a second header aperture 67, which may be one of a cathode supply aperture 36, cathode exhaust aperture 38, coolant supply aperture 40, coolant exhaust aperture 42, anode supply aperture 44, and anode exhaust aperture 46. The apertures 66, 67 are produced by a manufacturing process performed on the first plate 64 and the second plate 65, such as stamping. As shown in FIG. 3, the first header aperture 66 of the first plate 64 is defined by a first header edge 68. The first header edge 68 includes a first break 69. The second header aperture 67 of the second plate 65 is defined by a second header edge 70. The second header edge 70 includes a second break 71.

The first plate 64 includes a first header edge 68. The second plate 65 includes a second header edge 70. The header edges 68, 70 may form a bead on a primary surface 72 of both the first plate 64 and the second plate 65. When a plurality of the plates 14 is arranged to form the stack 10, header edges 68, 70 in adjacent plates 14 may act to secure one of the membrane electrode assemblies 12 and the gaskets 32 disposed on the primary surface 72. As illustrated in FIG. 3, the header edges 68, 70 include features such as protuberances and indents that define a tunnel region 76 of the plates 14. The breaks 69, 71 are located at opposing sides of the tunnel region 76. The tunnel region 76 may include a plurality of tunnel outlets 78 formed between the first plate 64 and the second plate 65. An edge cavity 80 having a substantially "V" shaped meeting of the first plate 64 and the second plate 65 may be formed between the header edges 68, 70. During stack 10 assembly, substantial alignment of the header edges 68, 70 from adjacent plates 14 form the supply headers 48 and the exhaust headers 50.

The breaks 69, 71 form a portion of the header edges 68, 70. The header apertures 66, 67 are substantially defined by the header edges 68, 70. The breaks 69, 71 are defined by a secondary edge 84 extending beyond the edge cavity 80. At least a portion of the first break 69 abuts a portion of the second break 71. As illustrated, at least a portion of the secondary edge 84 of the first break 69 abuts a portion of the secondary edge 84 of the second break 71. An abutment of the secondary edges 84 form a secondary edge abutment 85. The edge cavity 80 is interrupted by the breaks 69, 71, eliminating the substantially "V" shaped meeting of the first plate 64 and the second plate 65 present within the edge cavity 80. The breaks 69, 71 may be substantially rectangular in shape as shown, but other break shapes such as triangular, semi-circular, and the like may be used. The breaks 69, 71 may be substantially rectangular in shape to optimize a length of the secondary edge abutment 85. A rectangular shape of the breaks 69, 71 is preferred to eliminate an acute corner and to minimize a number of corners formed by the breaks 69, 71. In particular embodiments of the invention, the length of the secondary edge abutment 85 is greater than a distance between the header edges 68, 70 to militate against a plurality of water droplets bridging the breaks 69, 71. The plates 14 may have a plurality of breaks 69, 71, separating the header edge into a first portion having the plurality of tunnel outlets 78 and a second portion having the edge cavity 80. The breaks 69, 71 from adjacent plates 14 may be substantially aligned to form a water removal guide 92. In the embodiment shown in FIG. 3, breaks 69, 71 are located at opposing sides of the tunnel region 76.

A portion of the membrane electrode assemblies 12 may be formed from a non-conductive material 86 to electrically insulate successive plates 14. The non-conductive material 86 may be a polymeric film and in the form of a layer. The non-conductive material 86 may substantially follow an outer periphery 94 of the bipolar plate 14 and the unipolar plate 20, 22 as seen in FIG. 2. In the embodiment shown in FIG. 3, the non-conductive material 86 includes a plurality of third header apertures 88, which may be one of a cathode supply aperture 36, cathode exhaust aperture 38, coolant supply aperture 40, coolant exhaust aperture 42 anode supply aperture 44, and anode exhaust aperture 46. When a plurality of the plates 14 is arranged to form the stack 10, header edges 68, 70 in adjacent plates 14 having the bead secure the non-conductive material 86. The non-conductive material 86 disposed between the beads in adjacent plates 14 is secured when the stack 10 is compressed. The third header aperture 88 of the non-conductive material 86 includes a third break 90. The third header aperture 88 and the third break 90 are substantially aligned with the header apertures 66, 67 and breaks 69, 71.

Figure 4:
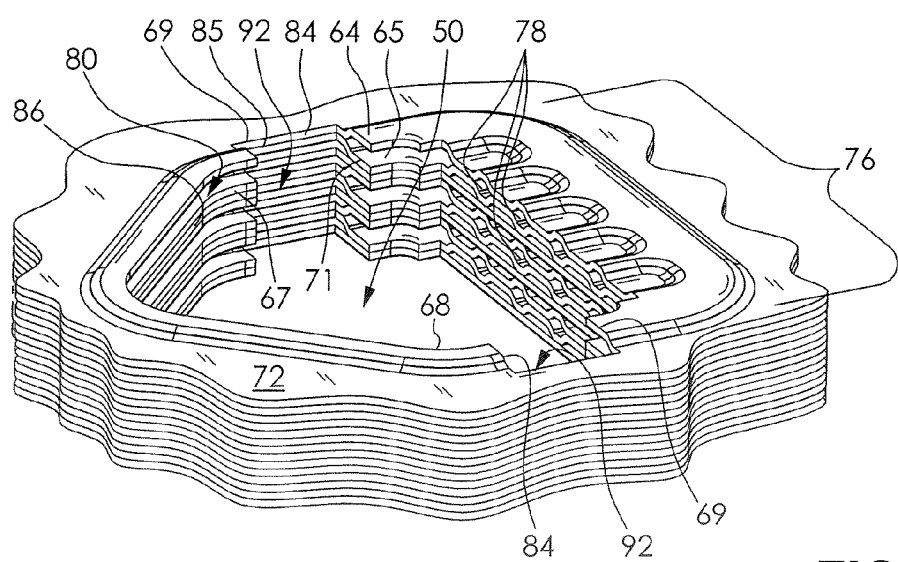
FIG. 4 is a fragmentary perspective view of a portion of an exhaust header including a non-conductive material according to an embodiment of the invention.

In the embodiment shown in FIG. 4, the water removal guide 92 is formed by the alignment of successive breaks 69, 71, 90 in the plates 14. The fuel cell stack 10 may have a plurality of water removal guides 92 formed in of one of the supply headers 48 and the exhaust headers 50. The quantity and placement of the water removal guides 92 may be tailored to suit the needs of the fuel cell stack 10. As a non-limiting example, the supply headers 48 may not require water removal guides 92 whereas the exhaust headers 50 may incorporate a plurality of water removal guides 92. The water removal guides 92 are substantially oriented downward, optimizing water drainage from one of the supply headers 48 and the exhaust headers 50 by the use of gravitational forces. The water removal guides 92 have a width W and a depth D. The width W, the depth D, and a size of the edge cavity 80 may be adjusted to optimize the water removal needs of the fuel cell stack 10. The width W may be adjusted to militate against the plurality of water droplets bridging across the water removal guides 92. As a non-limiting example, favorable water removal results have been obtained where the width W is from about 1 millimeters to about 5 millimeters and the depth D is from about 1 millimeter to about 3 millimeters.

Water in the edge cavities 80 is spread along the surface in a process termed spontaneous wetting or spontaneous imbibition. This process as it relates to open capillaries produced by V-shaped or triangular surface grooves is described, for example, in Rye et al., Langmuir, 12:555-565 (1996), hereby incorporated herein by reference in its entirety. The physical requirements to support spontaneous wetting in the corners of a channel are characterized by the Concus-Finn condition, $\beta+\alpha/2<90°$, where $\beta$ is a static contact angle formed between a liquid surface and a solid surface, and $\alpha$ is the channel corner angle, and in particular embodiments the angle formed by the joining of the first plate 64 having a first header edge 68 with the second plate 65 having the second header edge 70. The static contact angle $\beta$ is a property specific to a particular surface and material that is experimentally determined, for example, by placing a liquid droplet on the surface and recording when an equilibrium condition is met where no further spreading of the droplet occurs.

As a nonlimiting example, a rectangular channel has an $\alpha/2$ of 45°, which dictates that spontaneous wetting will occur when the static contact angle is less than 45°. As shown in FIGS. 3 and 4 of the present disclosure, the edge cavities 80 are substantially triangular and have a $\beta+\alpha/2<90°$, thereby satisfying the Concus-Finn condition. Thus, the edge cavities 80 will exhibit spontaneous wetting when exposed to water.

During fuel cell stack 10 operation, water produced may be forcefully ejected from the tunnel region 76 into the exhaust headers 50 by a flow of reactants through the stack 10. The water is collected by capillary action in the edge cavities 80, and is spread by a self wetting of a plurality of seams existing along the header edges 68, 70 of the exhaust headers 50. The water reaches one of the water removal guides 92, where the secondary edges 84 forming the breaks 69, 71 militate against a self wetting and water dispersion along the edge cavities 80. As shown in FIGS. 3 and 4 of the present disclosure, the secondary edge abutment 85 is flat and has a $\beta+\alpha/2>90°$, thereby not satisfying the Concus-Finn condition. Thus, the secondary edge abutment 85 will not exhibit spontaneous wetting when exposed to water. The amount of water collected in the edge cavities 80 increases to form the plurality of droplets protruding from the edge cavities 80 into the water removal guides 92. Additionally, reactant flow through the exhaust headers 50 acts to shear the droplets from the edge cavities 80 by a reactant gas shear force. The droplets, freed from the capillary forces of the edge cavities 80, flow by gravity through the water removal guides 92, where the water is subsequently removed from the fuel cell stack 10.

Upon shutdown of the fuel cell stack 10, water vapor present in one of the supply headers 48 and the exhaust headers 50 may condense in the headers 48, 50. The water is collected by capillary action in the edge cavities 80, and is spread by the self wetting of the plurality of seams existing along the header edges 68, 70 of one of the supply headers 48 and the exhaust headers 50. The water eventually reaches one of the water removal guides 92, where the secondary edges 84 forming the breaks 69, 71 militate against the self wetting and militate against water spreading along the edge cavities 80 and into the tunnel region 76. The water collected in the edge cavities 80 increases to form a plurality of droplets protruding from the edge cavities 80 into the water removal guides 92. The droplets, freed from the capillary forces of the edge cavities 80, flow by gravity through the water removal guides 92, where the water is subsequently removed from the fuel cell stack 10.

The water removal guides 92 militate against water spreading within one of the supply headers 48 and the exhaust headers 50 and subsequently militate against water from one of entering the tunnel regions 76 and forming of a plurality of menisci along an edge of the tunnel outlets 78. Water in the tunnel regions 76 after fuel cell stack 10 shut down may freeze, preventing the fuel cell stack 10 from restarting or result in poor performance of the fuel cell stack 10. Water collected in the headers 48, 50 during operation of the fuel cell stack 10 or by condensation may be effectively removed from the stack 10 by gravitational forces. The fuel cell stack 10 incorporating water removal guides 92 includes tunnel regions 76 that are substantially water free, resulting in increases in cold start performance of the fuel cell stack 10.

It should be appreciated that the present bipolar plate 14 is cost-effective by eliminating a need for additional components that facilitate water removal from the headers 48, 50 of a fuel cell stack 10. It is surprisingly found that the bipolar plate 14 is effective in militating against water entering the tunnel regions 76 of the bipolar plate 14. The bipolar plate 14 thereby militates against the tunnel regions of the fuel cell stack 10 from becoming blocked with frozen water.

In use, the water removal guides 92 provide a cost effective method of minimizing water from collecting in one of the supply headers 48 and the exhaust headers 50, and subsequently the tunnel region 76 of the bipolar plate 14.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A bipolar plate for a fuel cell comprising:
   a first plate having a first header edge defining a first header aperture, the first header edge having a first break; and
   a second plate disposed adjacent the first plate having a second header edge defining a second header aperture, the second header edge having a second break, a portion of the first break abutting a portion of the second break, the first break and first header aperture substantially aligned with the second break and second header aperture, the bipolar plate having a plurality of tunnel outlets along one of the first header edge and the second header edge.

2. The bipolar plate for a fuel cell of claim 1, wherein the first plate includes a plurality of first breaks and the second plate includes a plurality of second breaks, a substantial alignment of the first and second breaks separate a first portion of one of the first header edge and the second header edge having the plurality of tunnel outlets from a second portion of one of the first header edge and the second header edge.

3. The bipolar plate for a fuel cell of claim 1, wherein the first header edge is spaced from the second header edge.

4. The bipolar plate for a fuel cell of claim 1, wherein the plurality of tunnel outlets is formed between the first plate and the second plate.

5. The bipolar plate for a fuel cell of claim 1, wherein at least one of the first break and the second break has a substantially rectangular shape.

6. The bipolar plate for a fuel cell of claim 1, wherein one of the first break and the second break has a width from about 1 millimeters to about 5 millimeters, and a depth from about 1 millimeter to about 3 millimeters.

7. The bipolar plate for a fuel cell of claim 1, wherein the first break and the second break have a secondary edge abutment.

8. The bipolar plate for a fuel cell of claim 1, wherein the first header aperture and the second header aperture form a portion of one of a fuel cell stack anode supply header, a fuel cell stack anode exhaust header, a fuel cell stack cathode supply header, and a fuel cell stack cathode exhaust header.

9. The bipolar plate for a fuel cell of claim 8, wherein one of the first header edge and the second header edge includes a bead.

10. The bipolar plate for a fuel cell of claim 1, wherein one of the first break and the second break has a width greater than a distance from the first header edge to the second header edge.

11. A fuel cell comprising:
    a pair of bipolar plates for a fuel cell, each of the bipolar plates for a fuel cell having a first plate having a first header edge defining a first header aperture, the first header edge having a first break, and a second plate disposed adjacent the first plate having a second header edge defining a second header aperture, the second header edge having a second break, a portion of the first break abutting a portion of the second break, the first break and first header aperture substantially aligned with the second break and second header aperture, the bipolar plate having a plurality of tunnel outlets along one of the first header edge and the second header edge; and
    a membrane electrode assembly disposed between the pair of bipolar plates for a fuel cell, having a third header edge defining a third header aperture, the third header edge having a third break, the third break and third header aperture substantially aligned with the first break and the second break and the first header aperture and the second header aperture.

12. The fuel cell of claim 11, wherein the first plate includes a plurality of first breaks and the second plate includes a plurality of second breaks, a substantial alignment of the first and second breaks separate a first portion of one of the first header edge and the second header edge having the plurality of tunnel outlets from a second portion of one of the first header edge and the second header edge.

13. The fuel cell of claim 11, wherein the plurality of tunnel outlets is formed between the first plate and the second plate.

14. The fuel cell of claim 11, wherein at least one of the first break and the second break has a substantially rectangular shape.

15. The fuel cell of claim 11, wherein the first break and the second break have a secondary edge abutment.

16. The fuel cell of claim 11, wherein the first header aperture and the second header aperture form a portion of one of a fuel cell stack anode supply header, a fuel cell stack anode exhaust header, a fuel cell stack cathode supply header, and a fuel cell stack cathode exhaust header.

17. The fuel cell of claim 11, wherein one of the first break and the second break has a width greater than a distance from the first header edge to the second header edge.

18. The fuel cell of claim 11, wherein a substantially vertical alignment of the first break and the second break form a water removal guide.

19. A fuel cell stack comprising:
    a plurality of fuel cells, one of the fuel cells including a pair of bipolar plates for a fuel cell, each of the bipolar plates for a fuel cell having a first plate having a first header edge defining a first header aperture, the first header edge having a first break, and a second plate disposed adjacent the first plate having a second header edge defining a second header aperture, the second header edge having a second break, a portion of the first break abutting a portion of the second break, the first break and first header aperture substantially aligned with the second break and second header aperture, the bipolar plate having a plurality of tunnel outlets along one of the first header edge and the second header edge, and a membrane electrode assembly disposed between the pair of bipolar plates for a fuel cell, having a third header edge defining a third header aperture, the third header edge having a third break, the third break and third header aperture substantially aligned with the first break and the second break and the first header aperture and the second header aperture.

20. The fuel cell stack of claim 19, wherein a substantially vertical alignment of the first break and the second break form a water removal guide.

* * * * *